Patented May 22, 1934

1,959,824

UNITED STATES PATENT OFFICE 1,959,824

METHOD OF TREATING WATER-IN-OIL EMULSIONS

Abraham M. Herbsman, Huntington Park, Calif., assignor to Industrial Patents, Ltd., Los Angeles, Calif., a corporation of California No Drawing. Application October 10, 1931, Serial No. 568,211

4 Claims. (Cl. 196—4)

My invention relates to the treatment of petroleum emulsions and has for its principal object the provision of a novel method of agglomerating the dispersed water phase in these emulsions so that the oil in the emulsion may be separated from the water and become commercially useful.

It is also an object of my invention to provide a method of chemically treating petroleum emulsions to remove the water therefrom which is relatively inexpensive.

It is a still further object of my invention to provide a method of treating petroleum emulsions the effectiveness of which will not be decreased by hardness of the water in the emulsion.

The method of my invention belongs to that general type of emulsion treating method which embraces subjecting the emulsion to stand to settle out the water phase thereof. This method of course may be advantageously used by itself or in conjunction with other treating methods such as heating the emulsion or dehydrating it electrically.

While great difficulty has not been had in the breaking up of loose emulsions by methods in current use, no treatment has hitherto been devised which has been entirely satisfactory in the treatment of tight emulsions, that is, where the dispersed water phase is broken up into very fine particles.

It is accordingly another object of my invention to provide a method of treating petroleum emulsion with which satisfactory results can be obtained in the treating of tight petroleum emulsions.

In the treatment of tight emulsions by chemical methods hitherto employed, it frequently happens that only a partial break is effected by the chemical treatment, and this then must be completed by heating the emulsion, subjecting it to electrical dehydration or by some other secondary treatment if a rather long period of settling is to be avoided.

It is a still further object of my invention to provide a method of treating petroleum emulsion chemically in which a single application of chemical to a relatively tight emulsion sets up a coagulating activity in the emulsion which is maintained over a relatively long period of time.

In my search for a superior method of treating fresh petroleum emulsion to coagulate the water phase thereof I have discovered such a method in which the chemical treating agent includes two elements, one of which initiates the coagulating effect of the water particles so as to make of the tight emulsion a relatively loose one and the other element of the agent is of such a nature so as to then come into action and coagulate the large drops in the emulsion, thereby completing the breaking of the emulsion in a relatively short time.

The chemical agent which I use in the method above referred to, preferably consists of a mixture of components certain of which are in solution in others thereof. One of the basic ingredients of this re-agent is a sulphonated fatty glyceride which is mixed with an inorganic alkaline earth salt in solution in a suitable solvent. In practice the sulphonated glyceride comprises approximately 50% of the treating agent and the solvent between 30 and 50% thereof, the balance of the agent comprising the inorganic alkaline earth salt.

While I do not wish to limit myself to any particular species of the ingredients broadly referred to hereinabove, I have found certain species of these ingredients to be successful in the carrying out of my method of treatment and I shall mention these as preferable in making up the treating agent employed in my novel method referred to herein.

Examples of fatty glycerides which have been found satisfactory include: vegetable oil or fat, animal oil or fat, fish oil or fish stearine.

Satisfactory examples of inorganic alkaline salts which may be employed in my treating agent include: magnesium chloride, magnesium sulphate, calcium chloride, and calcium nitrate.

Types of solvents suitable for use in the agent of my method include: homologues of benzol, aliphatic alcohols, aromatic alcohols, phenols, anthracene oil, and mineral hydrocarbon solvents.

Also it might be specified that the following particular species of the types of solvents above mentioned have proved satisfactory. The term homologues of benzol includes such compounds as toluol, benzol and xylol. The term aliphatic alcohol includes methyl alcohol, ethyl alcohol, and propyl alcohol.

Suitable species of aromatic alcohols include: benzyl alcohol, tolyl carbinol, and salicyl alcohol.

Suitable examples of phenol include: phenol, resorcinol, and pyrogallol.

It might also be noted that anthracene oil comprises that fraction collected above 270° C. in the distillation of coal tar.

Examples of mineral hydrocarbon solvents suitable for my use include: commercial forms of gasoline, distillate, and oils which are derived from petroleum by distillation.

It is to be understood, of course, that a plurality of species of the general type of compound, mixed to form a treating agent to be applied in my method, may be included in this agent. For example, a mixture of alcohol and phenol, or benzol and gasoline might be used as a solvent in my re-agent. Likewise, different species of glycerides and/or of inorganic alkaline earth salt might be mixed together in a single treating agent formula.

In practicing the method of my invention, I preferably introduce a relatively small quantity of the treating agent described hereinabove into a relatively large quantity of the emulsion and then, either with or without treating the emulsion by heat or by electricity, permit the emulsion to stand so as to settle out the coagulated water phase and permit the oil to be recovered.

The usual manner of introducing the chemical treating agent into the emulsion is to either mix this agent directly with the emulsion in tanks, inject the agent into pipe lines carrying the emulsion from the well to the tank, or mix the treating agent with the emulsion in the well or while this is being pumped therefrom. As under different circumstances it is found preferable to introduce the agent into the emulsion in different ways, I do not desire to limit myself to any particular way of mixing the treating agent with the emulsion.

What I claim is:

1. A method of breaking petroleum emulsions, characterized by subjecting the emulsion to the action of a treating agent which is capable of hardening water and which includes a mixture of a sulphonated fatty glyceride, an inorganic alkaline earth salt, and a suitable solvent.

2. A method of breaking petroleum emulsions, characterized by subjecting the emulsion to the action of a treating agent which is capable of hardening water and which includes a mixture of a sulphonated fatty glyceride, an inorganic alkaline earth salt, and benzol or a homologue of benzol.

3. A method of breaking petroleum emulsions, characterized by subjecting the emulsion to the action of a treating agent which is capable of hardening water and which includes a mixture of a sulphonated fatty glyceride, an inorganic alkaline earth salt, and an aliphatic alcohol of less than four carbon atoms.

4. A method of breaking petroleum emulsions, characterized by subjecting the emulsion to the action of a treating agent which is capable of hardening water and which includes a mixture of a sulphonated fatty glyceride, an inorganic alkaline earth salt, and a mineral hydrocarbon solvent.

ABRAHAM M. HERBSMAN.